United States Patent Office 3,133,903
Patented May 19, 1964

3,133,903
POLYSULFONE OF 1,5-CYCLOOCTADIENE
August Henry Frazer, Wilmington, Del., assignor to E. I. du Pont de Nemours and Company, Wilmington, Del., a corporation of Delaware
No Drawing. Filed Mar. 1, 1962, Ser. No. 176,817
3 Claims. (Cl. 260—79.3)

This invention relates to a novel polymeric composition of matter. More particularly, it relates to a novel polymeric composition of the polysulfone type. Still more particularly, this invention relates to a linear polysulfone derived from a non-conjugated cyclic diene and sulfur dioxide, and to a process for the preparation of this polymeric composition.

Polysulfones have been known for many years, and have repeatedly been prepared and extensively evaluated. It has been conventional to prepare such polymers by the reaction of sulfur dioxide with a mono-olefinic hydrocarbon, thereby producing linear polymeric compositions containing one gram molecular weight of sulfur dioxide for every gram molecular weight of mono-olefinic hydrocarbon. Such polymers are characterized by their high degree of crystallinity, their lack of stability to thermal degradation, and the brittleness of shaped articles formed from them. Attempts have been made to prepare polysulfones from dienes, it being the goal to prepare such polymers containing two mols of sulfur dioxide for each mol of diene. Because each of the olefinic linkages in the dienes previously employed reacts independently, it has been found that all attempts to prepare such polysulfones from dienes have resulted in the preparation of cross-linked polymers.

It is an object of this invention to provide a novel polymeric composition of the polysulfone type.

It is a further object of this invention to provide a novel polymeric composition comprising a linear polysulfone containing two gram molecular weights of a sulfur dioxide for each gram molecular weight of diene.

It is a still further object of this invention to provide a novel polymeric composition of the polysulfone type which is characterized by its ability to be converted to films, fibers, and the like.

In accordance with these objects, there is provided a novel polymeric composition of matter characterized by the presence in the polymeric chain of recurring structural units having the empirical formula $C_8H_{12}S_2O_4$ and having a structure of the following bicyclic type:

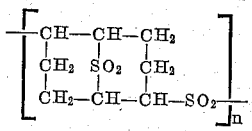

The polymer is characterized by its white color, its amorphous state, and by its ability to be converted to films, fibers, and other shaped articles. In the above formula, $n$ represents an integer having a value greater than about 12, such that the molecular weight is high enough for the fabrication of shaped articles.

The polysulfone of this invention is prepared by the reaction of sulfur dioxide with cis, cis-1,5-cyclooctadiene, in accordance with the following equation:

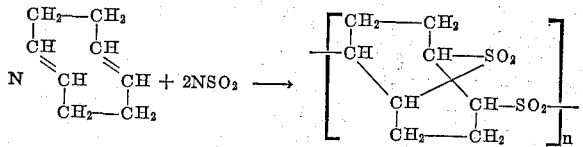

The reaction may be effected in any of a variety of solvents, and the rate and extent of reaction may be improved by the use of any of several catalytic agents, as will be described in greater detail hereinafter. By proper choice of the reaction conditions, the polymer may be prepared in high molecular weight and in high yield as a linear composition, as will be apparent from the examples which follow.

The preparation of the polymer of this invention may, as indicated above, be effected in any of several solvent media. Dimethylsulfoxide, tetramethylene sulfone, diethyl ether, liquid sulfur dioxide, and the like may be employed. Of these, tetramethylene sulfone is the preferred solvent for polymerization. The polymerization reaction is normally carried out by stirring the reactant and solvent in a flask equipped with a reflux condenser, cooled by means of Dry Ice, the top of the condenser being open to the atmosphere. Other procedures may be employed, however, including the use of pressure bombs. The reaction is generally effected at temperatures between about $-10°$ C. and about $30°$ C., although higher temperatures (e.g. up to about $100°$ C.) may be employed where enclosed reaction systems are utilized. The reaction is normally permitted to proceed for a period of time ranging from about one hour to about 16 hours although reaction times of up to several days may be utilized. The polymerization reaction may be catalyzed by any of several catalytic agents, among which may be named ascaridole/hydrochloric acid, ascaridole/hydrogen chloride gas, and methyl ethyl ketone peroxide. Atmospheric oxygen appears to be beneficial in producing high molecular weight polymer, and is, under some circumstances, a sufficient catalyst alone.

Poly(1,5-cyclooctadiene sulfone) is an amorphous polymer, in contrast to the polysulfones prepared from mono-olefinic hydrocarbons and sulfur dioxide, which are highly crystalline materials. The polymer is white in color and does not melt. Polysulfones in general are subject to thermal degradation, but the polysulfone of this invention has an activation energy for thermal decomposition of 41 kilocalories/mol whereas for the usual polyolefin sulfones this value is 32 kilocalories/mol (a significant difference of 9 kilocalories/mol). Its infra-red spectrum shows little or no unsaturation, and the polymer is soluble in such solvents as dimethyl sulfoxide, N-methyl pyrrolidone, sulfuric acid, aqueous sodium hydroxide, N,N-dimethylformamide/lithium chloride, and N,N-dimethylacetamide lithium chloride. Each of these factors may be interpreted as evidence for the bicyclic structures shown earlier, and, in aggregate, they conclusively show that a cross-linked polymeric structure is not formed by the reaction between sulfur dioxide and 1,5-cyclooctadiene.

The polymer of this invention may be converted to films, fibers, and other shaped articles in accordance with conventional procedures. Films may, for example, be cast from solutions of the polymer in suitable solvents, and are found to be flexible, creasible, and not brittle. Fibers may be prepared by wet or dry spinning techniques from solutions of the polymer in any of several solvents in accordance with normal procedures. Fibrids may also be prepared by conventional techniques.

The following examples will illustrate the present invention but are not intended to limit it in any way. In the examples, inherent viscosities ($\eta$ inh) are determined in accordance with the following equation:

$$\eta \text{ inh} = \frac{\ln \eta \text{ rel}}{C}$$

The relative viscosity ($\eta$ rel) may be determined by dividing the flow time in a capillary viscometer of a dilute solution of the polymer by the flow time for the pure solvent. The concentration (c) used in the examples is 0.5 grams of polymer per 100 ml. of solution, and the measurements are made at a temperature of $30°$ C.

Unless otherwise specified, inherent viscosities are measured in dimethyl sulfoxide.

Example I

Purification of 1,5-cyclooctadiene is accomplished by distillation under reduced pressure, the portion boiling within the range from about 67° C. to 69° C. at pressures of 46–49 mm. showing, by vapor phase analysis, a purity of 99%. To a round bottom flask equipped with a thermometer, a magnetic stirrer, and a Dry Ice cooled reflux condenser open to the atmosphere are added 10.8 grams (0.1 mols) of purified 1,5-cyclooctadiene, 12.8 grams (0.2 mols) of condensed sulfur dioxide, and 40 ml. of diethyl ether. To this solution are added five drops of ascaridole and 5 drops of concentrated hydrochloric acid, and the mixture is permitted to stand with stirring at the temperature of reflux of the sulfur dioxide for a period of 6 hours while the reaction proceeds. The mixture is diluted with methanol to effect precipitation of the polymeric product and the product is isolated by filtration. After being washed three times with methanol, with intermediate filtration, the polymer is dried overnight in an evacuated oven with nitrogen bleed. The white product is found to exhibit an inherent viscosity of 0.60, and to analyze for 24.8% sulfur, indicating that 73% of the product is of the desired type having two mols of sulfur dioxide per mol of 1,5-cyclooctadiene.

Example II

In a round bottom flask equipped with a thermometer, a magnetic stirrer, a Dry Ice cooled reflux condenser, and a nitrogen inlet, are placed 10.8 grams (0.1 mols) of purified 1,5-cyclooctadiene, 12.8 grams (0.2 mols) of condensed sulfur dioxide, and 150 ml. of redistilled tetramethylene sulfone. To the solution are added 5 drops of ascaridole and 10 drops of concentrated hydrochloric acid, while blanketing the reaction mixture with nitrogen. The reaction is permitted to proceed with stirring for a period of 16 hours at a temperature of 25° C. The polymeric product, upon isolation and washing with methanol as in the preceding example, is found to exhibit an inherent viscosity of 1.55. It is isolated in 89% yield.

Example III

A round bottom flask, equipped with a thermometer, a magnetic stirrer, and a Dry Ice cooled reflux condenser open to the atmosphere, is charged with 10.8 grams (0.1 mols) of purified 1,5-cyclooctadiene and 65.9 grams (1.0 mols) of condensed sulfur dioxide, which serves both as a reactant and as a solvent. To the solution are added 5 drops of methyl ethyl ketone peroxide, and the reaction is permitted to proceed with stirring for a period of two hours at a temperature of −4° C. at which temperature the sulfur dioxide refluxes. Upon precipitation, purification, and drying as previously described, the polymeric product is found to exhibit an inherent viscosity of 1.13. The sulfur analysis indicates that 85% of the polymeric product is of the desired type, having two mols of sulfur dioxide present for each mol of 1,5-cyclooctadiene.

Example IV

Redistilled tetramethylene sulfone, in the amount of 150 ml., 10.8 grams (0.1 mols) of purified 1,5-cyclooctadiene, and 64 grams (1.0 mols) of condensed sulfur dioxide are placed in a round bottom flask equipped with a thermometer, a magnetic stirrer, and a Dry Ice cooled reflux condenser open to the atmosphere. To the stirred solution are added 5 drops of methyl ethyl ketone peroxide, and the reaction is permitted to proceed at a temperature of 25° C. for a period of 72 hours. Upon isolating an working up the polymeric product, it is found to exhibit an inherent viscosity of 1.93. The product is obtained in 65% yield, of which 92% are shown by sulfur analysis to consist of the desired polymer having two mols of sulfur dioxide present for each mol of 1,5-cyclooctadiene.

Example V

To a round-bottom flask equipped with a thermometer, a magnetic stirrer, and a Dry Ice cooled reflux condenser open to the atmosphere are added 10.8 grams (0.1 mols) of purified 1,5-cyclooctadiene, 64 grams (1.0 mols) of condensed sulfur dioxide, and 120 ml. of dimethyl sulfoxide. To the stirred solution are added 5 drops of methyl ethyl ketone peroxide, and the reaction is permitted to proceed at a temperature of 23° C. for a period of 16 hours. The reaction mixture is diluted with methanol, and the polymeric product is isolated and purified as previously described. It is found to exhibit an inherent viscosity of 0.24, and is isolated in 66% yield, of which 92% is of the desired 2:1 sulfur dioxide: 1,5-cyclooctadiene mol ratio.

Example VI

In a one liter pressure bomb are placed 21.6 grams (0.2 mols) of purified 1,5-cyclooctadiene, and 300 ml. of distilled tetramethylene sulfone. The bomb is cooled by means of Dry Ice, and 128 grams (2.0 mols) of sulfur dioxide are added. The temperature of the bomb is raised to 50° C., and air is admitted to the bomb while maintaining the temperature constant. The reaction is permitted to proceed for a period of 8 hours at the latter temperature, and the polymer slurry is diluted with methanol and worked up as previously described. The resulting polymer is found to possess an inherent viscosity of 0.80, and 84% of the quantitative yield is shown, by sulfur analysis, to consist of the desired product.

Example VII

A sample of the polymer prepared as in Example IV and having an inherent viscosity of 1.7 is dissolved in dimethyl sulfoxide to form a solution containing 8% solids. This solution is wet-spun by extrusion through an orifice into a coagulating bath comprising 94% dimethyl sulfoxide and 6% water, the extrusion being effected at a temperature of 25° C. The fibers are wound up at the rate of 20 ft./min. and were capable of being backwound. Heating several such filaments together while still wet, either in a vacuum oven on a hot bar or under an infra-red lamp, brings about fusion to a single clear, strong filament having a tenacity/elongation/modulus ratio of 0.43/4.05/16.

Example VIII

A sample of the polymer of this invention prepared by oxygen catalysis and having an inherent viscosity of 1.51 is dissolved in dimethyl sulfoxide to prepare a homogeneous gel. This gel is converted to a spinnable solution containing 19.1% solids by heating to a temperature of 140° C. The solution is spun from a spinneret at a temperature of 150° C. into a column of air maintained at a temperature of 250° C. Best results are obtained by slowly pumping the solution through the spinneret. The fibers may be drawn approximately 2X over a hot pin maintained at a temperature of 122° C., following which they exhibit a tenacity/elongation/modulus ratio of 0.62/5/31.

Example IX

Solutions of the polymer of this invention dissolved in dimethyl sulfoxide and having a solids content of 10% are cast to form flexible, amorphous, creasible films which are not brittle. Such films are characterized by exhibiting a tenacity/elongation/modulus ratio of 0.51/2.0/29.

The polymer of this invention finds utility in the form of shaped articles. Fibers and films comprising this polymer may be employed in numerous areas of application. Fibers may be utilized, either alone or in blends with other fibrous materials, in fabrics for a variety of industrial and domestic applications. Films may be employed for various wrapping and protective purposes. Fibrids of the polymer may be utilized, either alone or in conjunction with wood pulp, for the preparation of papers for industrial applications.

Many equivalent modifications will be apparent to those skilled in the art from a reading of the above without a departure from the inventive concept.

What is claimed is:

1. A polymer having an inherent viscosity in dimethyl sulfoxide at 30° C. of at least about 0.2 consisting essentially of a repeating unit of the formula:

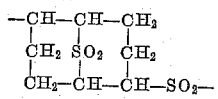

2. A process for forming the polymer of claim 1 which comprises stirring together 1,5-cyclooctadiene and at least an equivalent amount of sulfur dioxide in a solvent from the class consisting of dimethylsulfoxide, tetramethylene sulfone, diethyl ether and liquid sulfur dioxide at a temperature between about $-10°$ C. and about 100° C. for a period of about at least one hour and thereafter recovering the polymerized product.

3. The process of claim 2 wherein the reactants are combined in the presence of a catalytic amount of a material from the class consisting of ascaridole-hydrochloric acid, ascaridole/hydrogen chloride gas, methyl ethyl ketone peroxide and air.

References Cited in the file of this patent
UNITED STATES PATENTS 2,568,656  Parrish ---------------- Sept. 18, 1951

FOREIGN PATENTS 716,048  Great Britain ---------- Sept. 29, 1954